(12) United States Patent
Otugen et al.

(10) Patent No.: US 11,656,241 B2
(45) Date of Patent: May 23, 2023

(54) MICRO-FABRICATED OPTICAL MOTION SENSOR

(71) Applicants: Southern Methodist University, Dallas, TX (US); Michigan Aerospace Corporation, Ann Arbor, MI (US)

(72) Inventors: Volkan Otugen, Dallas, TX (US); Bruce Gnade, Lewisville, TX (US); Dominique Fourguette, Stevenson Ranch, CA (US)

(73) Assignees: Southern Methodist University, Dallas, TX (US); Michigan Aerospace Corporation, Ann Arbor, MI (US)

( * ) Notice: Subject to any disclaimer, the term of this patent is extended or adjusted under 35 U.S.C. 154(b) by 176 days.

(21) Appl. No.: 17/174,175

(22) Filed: Feb. 11, 2021

(65) Prior Publication Data

US 2021/0255213 A1 Aug. 19, 2021

Related U.S. Application Data

(60) Provisional application No. 62/975,376, filed on Feb. 12, 2020.

(51) Int. Cl.
| | |
|---|---|
| *G01P 15/093* | (2006.01) |
| *G01V 1/18* | (2006.01) |
| *G01P 13/00* | (2006.01) |
| *G02B 6/43* | (2006.01) |

(52) U.S. Cl.
CPC ............ *G01P 15/093* (2013.01); *G01P 13/00* (2013.01); *G01V 1/18* (2013.01); *G02B 6/43* (2013.01)

(58) Field of Classification Search
CPC ......... G01P 15/093; G01P 13/00; G01V 1/18; G02B 6/43
See application file for complete search history.

(56) References Cited

U.S. PATENT DOCUMENTS

| | | | |
|---|---|---|---|
| 8,718,416 B2 | 5/2014 | Ioppolo et al. | |
| 8,743,372 B2 | 6/2014 | Fourguette et al. | |
| 2012/0056363 A1* | 3/2012 | Ritter | G01V 1/18 267/158 |

(Continued)

OTHER PUBLICATIONS

Allied Market Research, "Seismometers Market by Type . . . Opportunity Analysis and Industry Forecast, 2017-2023," https://www.alliedmarketresearch.com/seismometers-market, accessed Apr. 27, 2021, 9 pp.

(Continued)

*Primary Examiner* — Xin Y Zhong
(74) *Attorney, Agent, or Firm* — Daniel J. Chalker; Chalker Flores, LLP

(57) ABSTRACT

An optical motion sensor includes a substrate, a whispering-gallery-mode-based optical resonator disposed on the substrate, a mass-spring-damper system disposed on the substrate proximate to a first side of the whispering-gallery-mode-based optical resonator, and a waveguide or optical fiber. The whispering-gallery-mode-based optical resonator has a substantially circular cross-section. A gap separates an end of the mass-spring-damper system from the whispering-gallery-mode-based optical resonator. The waveguide or optical fiber abuts a second side of the whispering-gallery-mode-based optical resonator that is substantially opposite to the first side.

25 Claims, 5 Drawing Sheets

(56) References Cited

U.S. PATENT DOCUMENTS

2014/0283601 A1* 9/2014 Bhave ............... G01B 11/14
73/504.12
2015/0107357 A1* 4/2015 Hentz ............... G01D 5/268
73/382 G

OTHER PUBLICATIONS

Dimension Engineering, "A beginner's guide to accelerometers," https://www.dimensionengineering.com/info/accelerometers, accessed Apr. 21, 2021, 2 pp.

Garcia, C., et al., "Micro-Seismometers via Advanced Meso-scale Fabrication," 2011 Monitoring Research Review: Ground Based Nuclear Explosion Monitoring Technologies, 2011, pp. 274-282, www.ideo.columbia.edu/res/pi/Monitoring/Doc/Srr_2011/PAPERS/02-06.PDF.

Goodrich, R., et al., "Accelerometers, What They Are & How They Work," Livescience, Oct. 1, 2013, 11 pp., https://www.livescience.com/40102-accelerometers.html.

John, et al., "Design and Fabrication of Silicon Micro-structure for Seismometers," ISSS International Conf. on Smart Materials, Structures and Systems, Jul. 8-14, 2014, Bangolore, India, 6 pp.

Markets and Markets, "Accelerometer and Gyroscope Market worth 3.50 billion USD by 2022," https://www.marketsandmarkets.com/PressReleases/accelerometer-gyroscope.asp, accessed Apr. 27, 2021, 7 pp.

Mims, F., "Build a Beautiful Seismometer to Detect Quakes and Explosions," Make.com, https://makezine.com/projects/make-experimental-optical-fiber-seismometer/, Jan. 21, 2016, 14 pp.

Saxena, G. D., et al., "Design, Development and Testing of MEMS based Seismometer for Space Application," 2013 International Conference on Advances in Computing, Communications and Information, pp. 1705-1709.

Stanford News, Kerr Than, "Stanford Researchers Build a 'billion sensors' earthquake observatory with optical fibers," Oct. 19, 2017, 4 pp., https://news.stanford.edu/2017/10/19/building-billion-sensor-quake-monitor-optical-fibers/.

Sun, Z., et al., "A MEMS based Electrochemical Seismometer with Low Cost and Wide Working Bandwidth," ScienceDirect, Procedia Engineering 168, 2016, pp. 806-809.

* cited by examiner

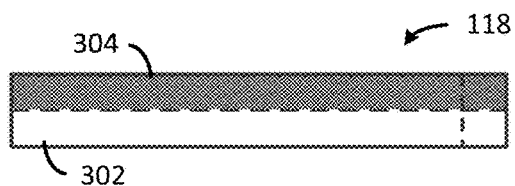
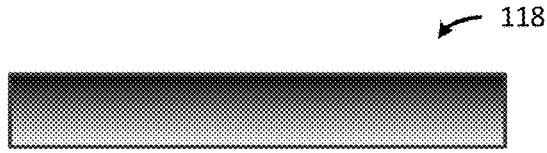
FIG. 3A    FIG. 3B
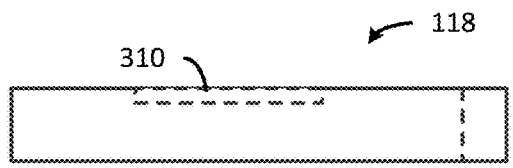
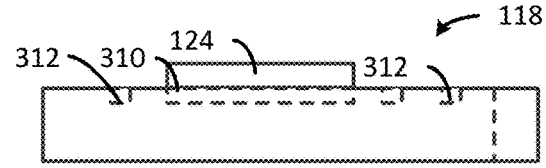
FIG. 3C    FIG. 3D
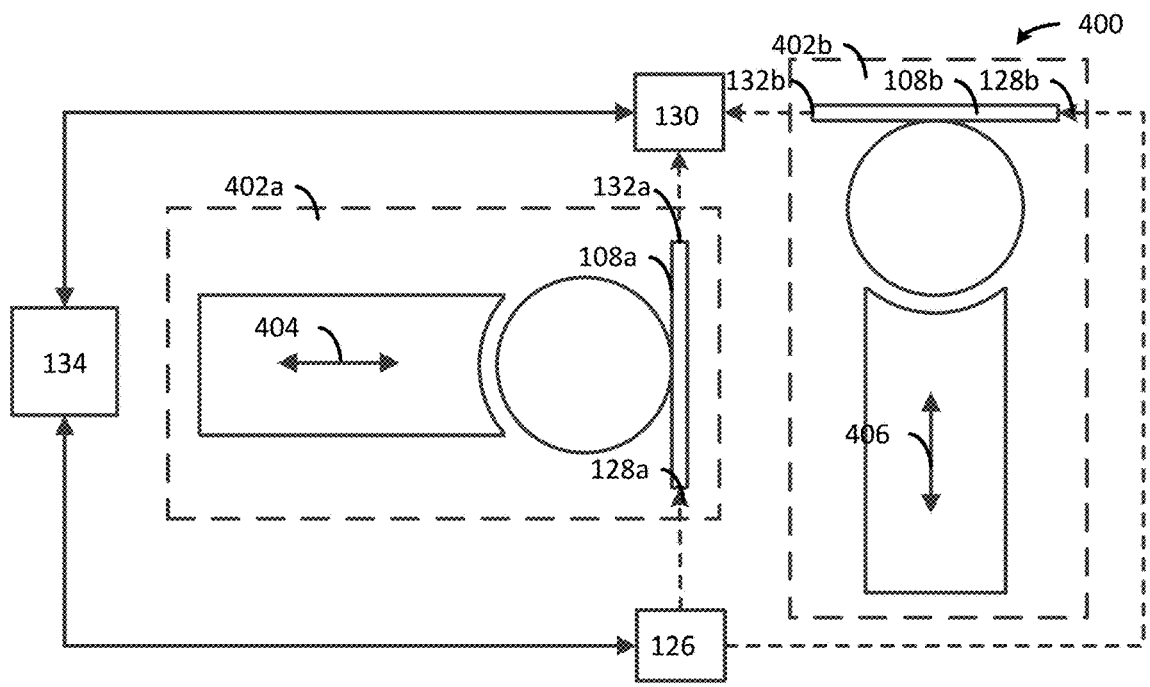
FIG. 4
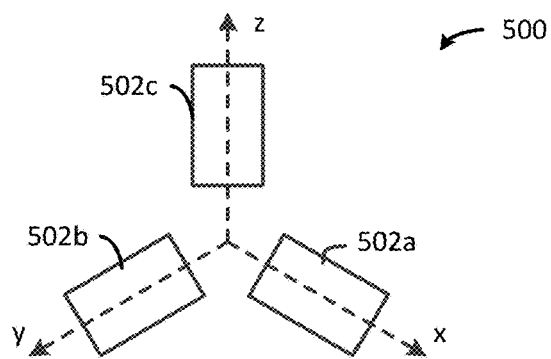
FIG. 5

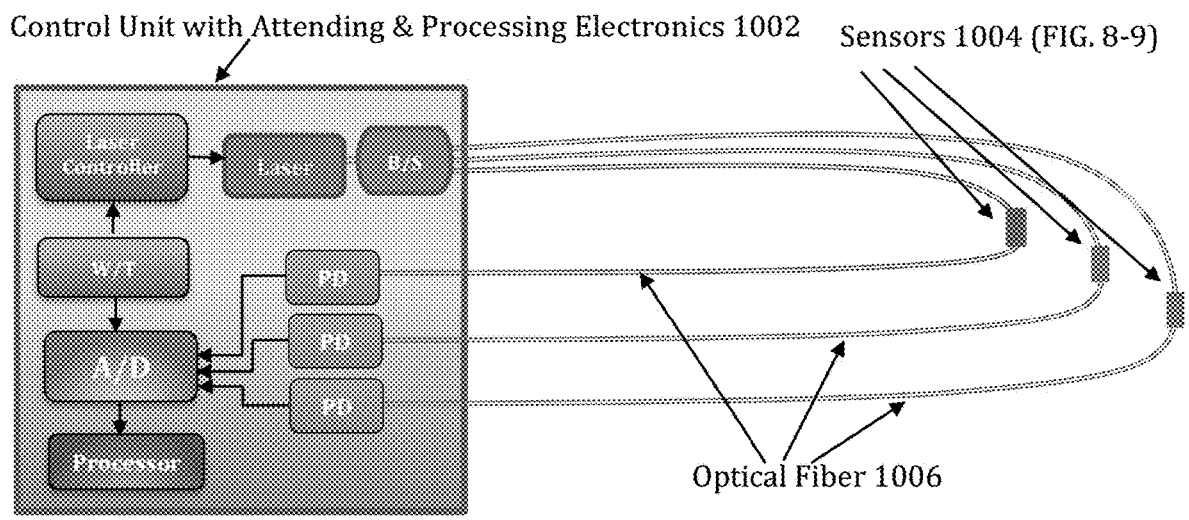
FIG. 10
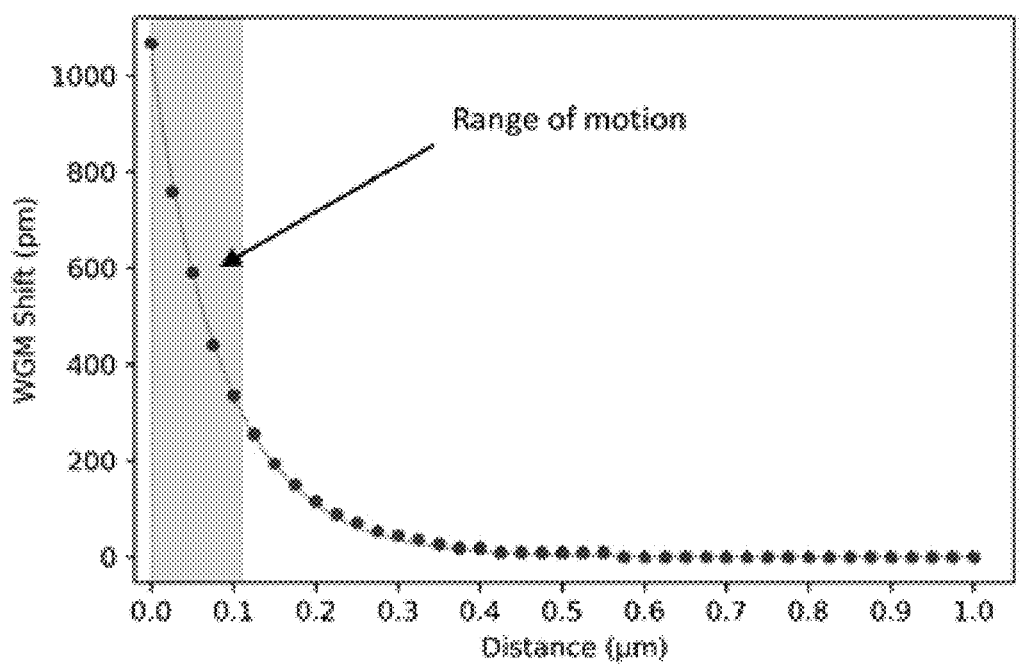
FIG. 11 WGM shift with changing resonator-beam gap

MICRO-FABRICATED OPTICAL MOTION SENSOR

CROSS-REFERENCE TO RELATED APPLICATIONS

This application claims priority to U.S. Provisional Patent Application Ser. No. 62/975,376 filed on Feb. 12, 2020 entitled Micro-Fabricated Optical Motion Sensor, the entire contents of which are hereby incorporated by reference.

STATEMENT OF FEDERALLY FUNDED RESEARCH

Not applicable.

TECHNICAL FIELD OF THE INVENTION

The present invention relates in general to the field of sensors, and more particularly, to a micro-fabricated optical motion sensor.

BACKGROUND OF THE INVENTION

Without limiting the scope of the invention, its background is described in connection with the optical sensors.

U.S. Pat. No. 8,718,416 discloses a micro-optical electric field sensor that exploits morphology-dependent shifts of the optical modes of dielectric cavities to measure temporally- and spatially-resolved electric fields with extremely high sensitivity. The measurement principle is based on the electrostriction effect on the optical modes of dielectric micro-resonators (or micro-cavities) and exploits recent developments in optical fiber and switching technologies. The optical modes are commonly referred to as "whispering gallery modes" (WGM) or "morphology dependent resonances" (MDR). By monitoring the WGM shifts, the electric field causing the electrostriction effect can be determined. Different sensitivities and measurement ranges (maximum measured electric field) can be obtained by using different cavity geometries (for example solid or hollow spheres), polymeric materials (PMMA, PDMS, etc) as well as poling the dielectric material.

U.S. Pat. No. 8,743,372 discloses a whispering-gallery-mode-based seismometer that provides for receiving laser light into an optical fiber, operatively coupling the laser light from the optical fiber into a whispering-gallery-mode-based optical resonator, operatively coupling a spring of a spring-mass assembly to a housing structure; and locating the whispering-gallery-mode-based optical resonator between the spring-mass assembly and the housing structure so as to provide for compressing the whispering-gallery-mode-based optical resonator between the spring-mass assembly and the housing structure responsive to a dynamic compression force from the spring-mass assembly responsive to a motion of the housing structure relative to an inertial frame of reference.

The foregoing patents are hereby incorporated by reference in their entirety.

SUMMARY OF THE INVENTION

In one embodiment, an optical motion sensor includes: a substrate; a whispering-gallery-mode-based optical resonator disposed on the substrate, wherein the whispering-gallery-mode-based optical resonator has a substantially circular cross-section; a mass-spring-damper system disposed on the substrate proximate to a first side of the whispering-gallery-mode-based optical resonator, wherein an end of the mass-spring-damper system is separated from the whispering-gallery-mode-based optical resonator by a gap; and a waveguide or optical fiber abutting a second side of the whispering-gallery-mode-based optical resonator that is substantially opposite to the first side.

In one aspect, the end of the mass-spring-damper system comprises a concave-shaped end such that the gap is substantially uniform between the concave-shaped end of the mass-spring-damper system and the first side of the whispering-gallery-mode-based optical resonator. In another aspect, the mass-spring-damper system comprises: a first structure; and one or more second structures flexibly connecting the first structure to the substrate such that a movement of the first structure is substantially limited to a direction substantially perpendicular to the waveguide or optical fiber. In another aspect, a tuning mass is disposed on a top of the first structure or integrated into the top of the first structure. In another aspect, the first structure comprises a least a lower portion having a first mass and an upper portion having a second mass, wherein the second mass of the upper portion is greater that the first mass of the lower portion. In another aspect, the one or more second structures comprise one or more bottom support structures connecting a top surface of the substrate to one or more portions of a bottom surface of the first structure. In another aspect, the one or more second structures comprise one or more side support structures connecting one or more portions of opposing sides of the first structure to the substrate such that the first structure is suspended above the substrate. In another aspect, the one or more side support structures comprise a first sidewall connected to the substrate proximate to one side of the first structure, a second sidewall connected to the substrate proximate to an opposite side of the first structure, and one or more flexures or arms connecting each of the first sidewall and second sidewall. In another aspect, a laser light source is coupled to a first end of the waveguide or optical fiber; and a detector is coupled to a second end of the waveguide or optical fiber. In another aspect, the laser light source comprises a diode laser; and the detector comprises a frequency scanning photodetector. In another aspect, the detector determines a measure of a change in the gap caused by a motion using a frequency of nulls/dips in a transmitted light received from the waveguide or optical fiber. In another aspect, the optical motion sensor comprises a seismometer, an accelerometer or a vibrometer.

In another embodiment, a method for detecting a motion includes providing an optical motion sensor, wherein the optical motion sensor includes: a substrate; a whispering-gallery-mode-based optical resonator disposed on the substrate, wherein the whispering-gallery-mode-based optical resonator has a substantially circular cross-section; a mass-spring-damper system disposed on the substrate proximate to a first side of the whispering-gallery-mode-based optical resonator, wherein an end of the mass-spring-damper system is separated from the whispering-gallery-mode-based optical resonator by a gap; and a waveguide or optical fiber abutting a second side of the whispering-gallery-mode-based optical resonator that is substantially opposite to the first side. A laser light is transmitted into the waveguide or optical fiber using a laser light source, and the motion is detected based on a frequency of nulls/dips in the laser light received from the waveguide or optical fiber using a detector.

In one aspect, the end of the mass-spring-damper system comprises a concave-shaped end such that the gap is substantially uniform between the concave-shaped end of the mass-spring-damper system and the first side of the whispering-gallery-mode-based optical resonator. In another aspect, the mass-spring-damper system comprises: a first structure; and one or more second structures flexibly connecting the first structure to the substrate such that a movement of the first structure is substantially limited to a direction substantially perpendicular to the waveguide or optical fiber. In another aspect, the mass-spring-damper system further comprises a tuning mass disposed on a top of the first structure or integrated into the top of the first structure. In another aspect, the first structure comprises a least a lower portion having a first mass and an upper portion having a second mass, wherein the second mass of the upper portion is greater that the first mass of the lower portion. In another aspect, the one or more second structures comprise one or more bottom support structures connecting a top surface of the substrate to one or more portions of a bottom surface of the first structure. In another aspect, the one or more second structures comprise one or more side support structures connecting one or more portions of opposing sides of the first structure to the substrate such that the first structure is suspended above the substrate. In another aspect, the one or more side support structures comprise a first sidewall connected to the substrate proximate to one side of the first structure, a second sidewall connected to the substrate proximate to an opposite side of the first structure, and one or more flexures or arms connecting each of the first sidewall and second sidewall. In another aspect, the laser light source comprises a diode laser; and the detector comprises a frequency scanning photodetector. In another aspect, the method further comprises creating the nulls/dips in the laser light whenever a change in the gap is caused by the motion. In another aspect, the motion comprises a seismic motion, an acceleration or a vibration.

In another embodiment, a method for fabricating an optical motion sensor includes: providing a substrate; creating or attaching a whispering-gallery-mode-based optical resonator on the substrate, wherein the whispering-gallery-mode-based optical resonator has a substantially circular cross-section; creating or attaching a mass-spring-damper system on the substrate proximate to a first side of the whispering-gallery-mode-based optical resonator, wherein an end of the mass-spring-damper system is separated from the whispering-gallery-mode-based optical resonator by a gap; and abutting a waveguide or optical fiber to a second side of the whispering-gallery-mode-based optical resonator that is substantially opposite to the first side.

In one aspect, the end of the mass-spring-damper system comprises a concave-shaped end such that the gap is substantially uniform between the concave-shaped end of the mass-spring-damper system and the first side of the whispering-gallery-mode-based optical resonator. In another aspect, creating or attaching the mass-spring-damper system on the substrate comprises: providing a first structure; and flexibly connecting the first structure to the substrate using one or more second structures such that a movement of the first structure is substantially limited to a direction substantially perpendicular to the waveguide or optical fiber. In another aspect, the method further comprises depositing or attaching a tuning mass on a top of the first structure or into the top of the first structure. In another aspect, the first structure comprises a least a lower portion having a first mass and an upper portion having a second mass, wherein the second mass of the upper portion is greater that the first mass of the lower portion. In another aspect, the one or more second structures comprise one or more bottom support structures connecting a top surface of the substrate to one or more portions of a bottom surface of the first structure. In another aspect, the one or more second structures comprise one or more side support structures connecting one or more portions of opposing sides of the first structure to the substrate such that the first structure is suspended above the substrate. In another aspect, the one or more side support structures comprise a first sidewall connected to the substrate proximate to one side of the first structure, a second sidewall connected to the substrate proximate to an opposite side of the first structure, and one or more flexures or arms connecting each of the first sidewall and second sidewall. In another aspect, the method further comprises: coupling a laser light source a first end of the waveguide or optical fiber; and coupling a detector to a second end of the waveguide or optical fiber. In another aspect, the laser light source comprises a diode laser; and the detector comprises a frequency scanning photodetector. In another aspect, the optical motion sensor comprises a seismometer, an accelerometer or a vibrometer.

In another embodiment, a multidirectional optical motion sensor includes: a first optical motion sensor oriented to detect a first motion along a first direction; a second optical motion sensor oriented to detect a second motion along a second direction, wherein the second direction is different than the first direction. Each optical motion sensor includes: a substrate, a whispering-gallery-mode-based optical resonator disposed on the substrate, wherein the whispering-gallery-mode-based optical resonator has a substantially circular cross-section, a mass-spring-damper system disposed on the substrate proximate to a first side of the whispering-gallery-mode-based optical resonator, wherein an end of the mass-spring-damper system is separated from the whispering-gallery-mode-based optical resonator by a gap, and a waveguide or optical fiber abutting a second side of the whispering-gallery-mode-based optical resonator that is substantially opposite to the first side.

In one aspect, the second direction is orthogonal to the first direction. In another aspect, the sensor further includes a third optical motion sensor oriented to detect a third motion along a third direction, wherein the third direction is different than the first direction and the second direction. In another aspect, the end of the mass-spring-damper system comprises a concave-shaped end such that the gap is substantially uniform between the concave-shaped end of the mass-spring-damper system and the first side of the whispering-gallery-mode-based optical resonator. In another aspect, the mass-spring-damper system comprises: a first structure; and one or more second structures flexibly connecting the first structure to the substrate such that a movement of the first structure is substantially limited to a direction substantially perpendicular to the waveguide or optical fiber. In another aspect, the sensor further comprising a tuning mass disposed on a top of the first structure or integrated into the top of the first structure. In another aspect, the first structure comprises a least a lower portion having a first mass and an upper portion having a second mass, wherein the second mass of the upper portion is greater that the first mass of the lower portion. In another aspect, the one or more second structures comprise one or more bottom support structures connecting a top surface of the substrate to one or more portions of a bottom surface of the first structure. In another aspect, the one or more second structures comprise one or more side support structures connecting one or more portions of opposing sides of the first structure to the substrate such that the first structure is suspended above the substrate. In another aspect, the one or more side support structures comprise a first sidewall connected to the substrate proximate to one side of the first structure, a second sidewall connected to the substrate proximate to an opposite side of the first structure, and one or more flexures or arms connecting each of the first sidewall and second sidewall. In another aspect, the sensor further includes: a laser light source coupled to a first end of each waveguide or optical fiber; and a detector coupled to a second end of each waveguide or optical fiber. In another aspect, the laser light source comprises a diode laser; and the detector comprises a frequency scanning photodetector. In another aspect, the detector determines a measure of a change in the gap caused by a motion using a frequency of nulls/dips in a transmitted light received from each waveguide or optical fiber. In another aspect, the optical motion sensor comprises a seismometer, an accelerometer or a vibrometer.

BRIEF DESCRIPTION OF THE DRAWINGS

For a more complete understanding of the features and advantages of the present invention, reference is now made to the detailed description of the invention along with the accompanying figures and in which:

FIGS. 3A, 3B, 3C and 3D are schematic block diagrams illustrating different tuning masses disposed on a top of the first structure or integrated into the top of the first structure in accordance with various embodiments of the present invention;

FIG. 4 is a schematic block diagram of a multidirectional optical motion sensor (two directions) in accordance with another embodiment of the present invention;

FIG. 5 is a block diagram of a multidirectional optical motion sensor (three directions) in accordance with another embodiment of the present invention;

FIG. 10 is schematic of an instrument in accordance with another embodiment of the present invention; and FIG. 11 is a graph of WGM shift with changing resonator-beam gap in accordance with another embodiment of the present invention.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not limit the invention, except as outlined in the claims.

As will be described in more detail below, various embodiments of the present invention provide an optical, compact, high-sensitivity, large bandwidth and low power consumption micro-fabricated motion sensor. The motion sensor can be used as seismometer, accelerometer or vibrometer. The basic components of the seismometer are a whispering gallery mode optical (dielectric) micro-resonator and a dielectric micro-beam placed in close proximity to each other. The resonator and the beam are placed on a substrate. Several micro-resonator and micro-beam geometries and materials can be used to optimize the instrument's sensitivity, range and bandwidth. The principle of operation is based on the shifts of whispering galley optical modes (or morphology dependent resonances) of the dielectric micro-resonator. The acceleration (due to seismic activity) causes a small movement of the dielectric micro-beam relative to the resonator allowing it to penetrate the evanescent field (tail) extending from the surface of the resonator thereby causing a shift of the whispering gallery mode of the resonator. A tuning mass is placed on the beam to optimize the seismometer sensitivity and bandwidth. A waveguide or an optical fiber abuts the micro-resonator on the side opposite to the beam so as to provide for coupling evanescent light from a frequency-scanned diode laser into the micro-resonator to excite the whispering gallery modes of the resonator, therein which are detected by a photodetector from nulls or dips in the light transmitted through the optical fiber. The frequency of the nulls/dips in the transmitted light provides a measure of the change in the relative spacing between the dielectric micro-beam and the optical resonator caused by the acceleration. As a result, no electrical power is required at the sensor itself.

Figure 1A:
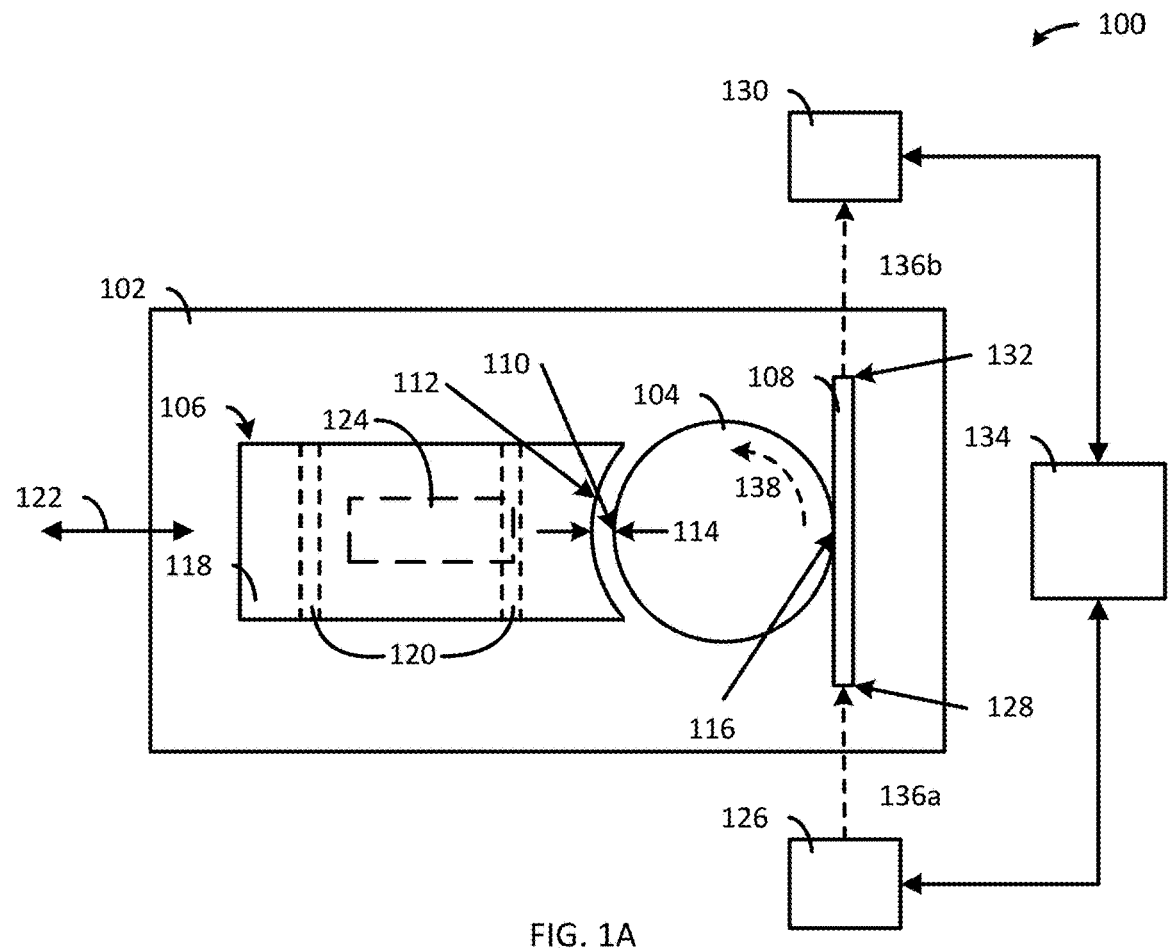
FIGS. 1A and 1B are schematic block diagrams of an optical motion sensor (top view and side view, respectively) in accordance with one embodiment of the present invention.
Figure 1B:
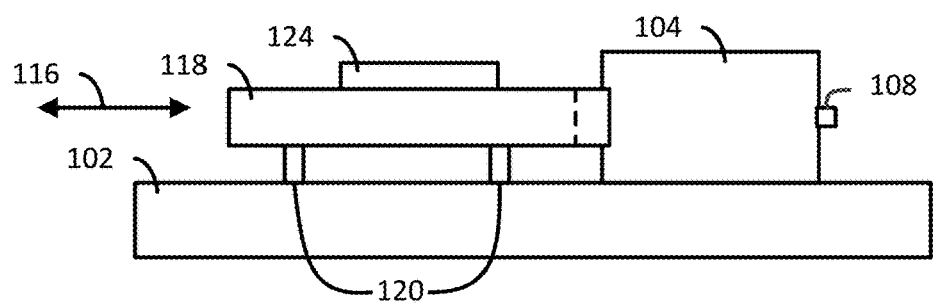

FIGS. 1A and 1B are schematic block diagrams of an optical motion sensor 100 (top view and side view, respectively) in accordance with one embodiment of the present invention. Note that the elements shown are not to scale and may not reflect the actual shape of the elements. The optical motion sensor 100 includes a substrate 102, a whispering-gallery-mode-based optical resonator 104, a mass-spring-damper system 106, and a waveguide or optical fiber 108. The whispering-gallery-mode-based optical resonator 104 is disposed on the substrate 102 and has a substantially circular cross-section. The mass-spring-damper system 106 is disposed on the substrate 102 proximate to a first side 110 of the whispering-gallery-mode-based optical resonator 104, wherein an end 112 of the mass-spring-damper system 106 is separated from the whispering-gallery-mode-based optical resonator 104 by a gap 114. As shown, the end 112 of the mass-spring-damper system 106 is a concave-shaped end such that the gap 114 is substantially uniform between the concave-shaped end 112 of the mass-spring-damper system 106 and the first side 110 of the whispering-gallery-modebased optical resonator 104. The mass-spring-damper system 106 can be any shape, but having the end 112 concave increases the sensitivity of the sensor 100. The waveguide or optical fiber 108 abuts a second side 116 of the whispering-gallery-mode-based optical resonator 104 that is substantially opposite to the first side 110.

Figure 2A:
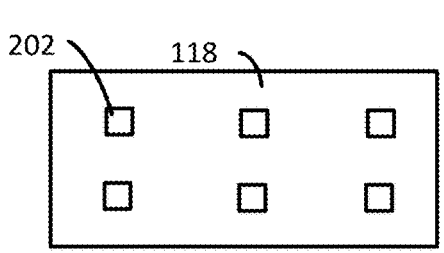
FIGS. 2A and 2B are schematic block diagrams illustrating different ways to attach the mass-spring-damper system to the substrate in accordance with various embodiments of the present invention.
Figure 2B:
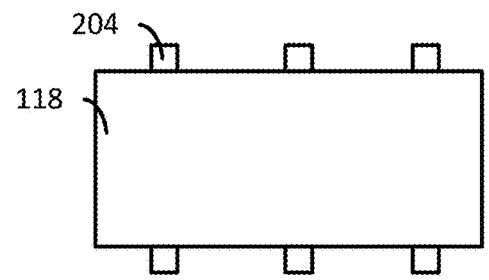
Figure 8:
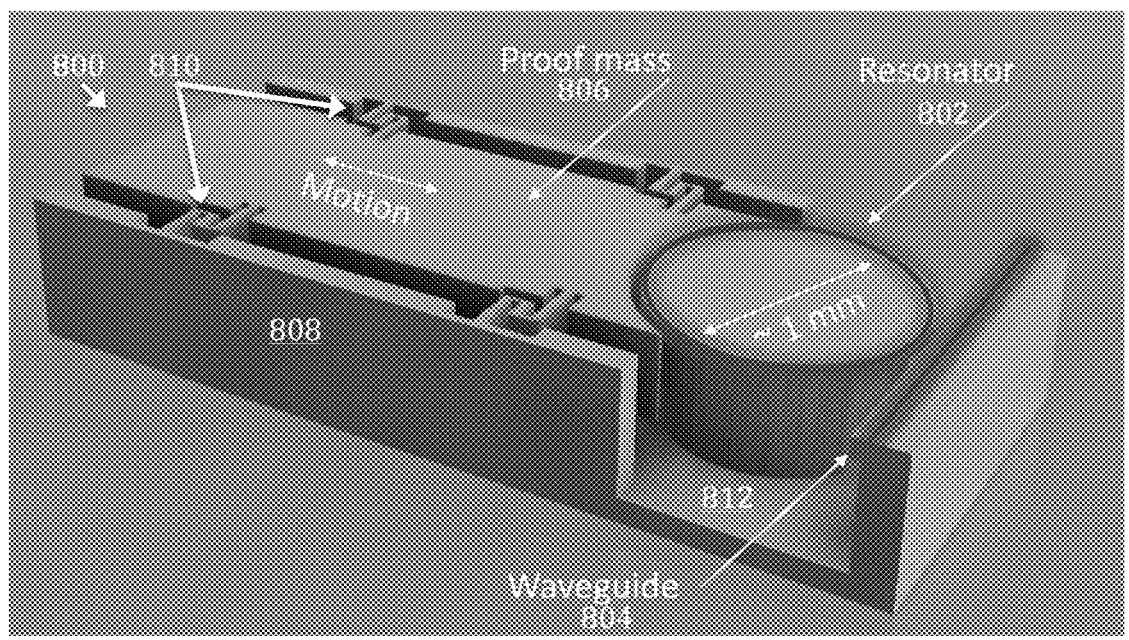
FIG. 8 is a schematic of a micro-seismometer core in accordance with another embodiment of the present invention.
Figure 9:
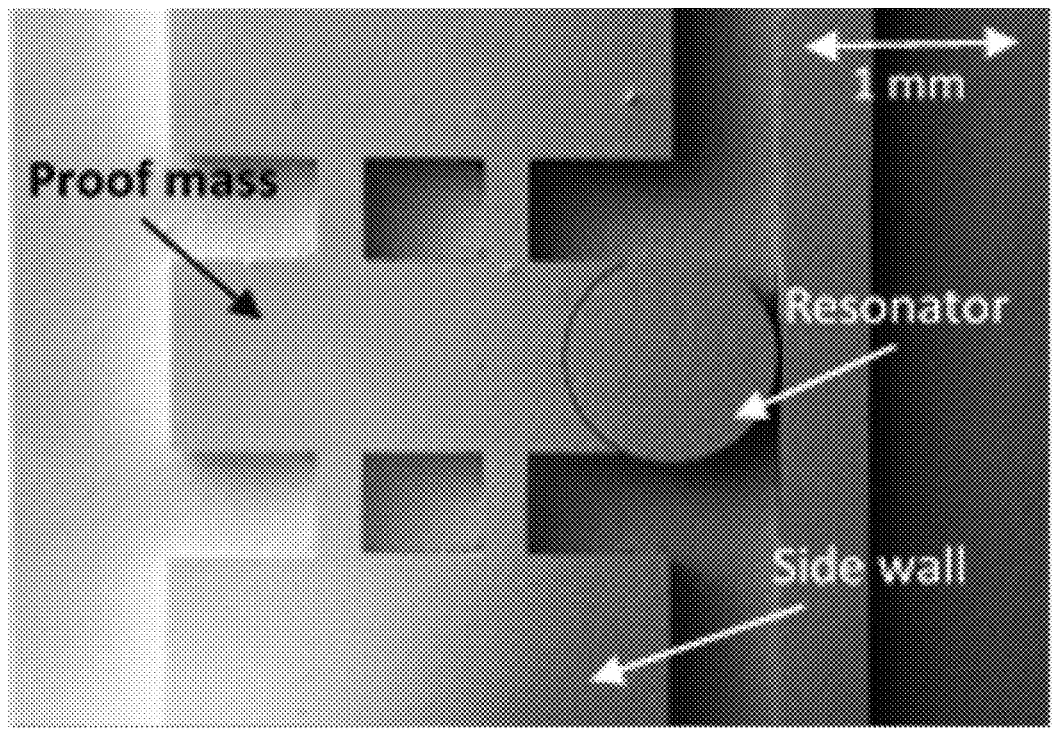
FIG. 9 is an image of a prototype of a micro-seismometer core in accordance with another embodiment of the present invention.

The mass-spring-damper system 106 can include a first structure 118 and one or more second structures 120 flexibly connecting the first structure 118 to the substrate 102 such that a movement of the first structure 118 is substantially limited to a direction 122 substantially perpendicular to the waveguide or optical fiber 108. The one or more second structures 120 can be legs, columns, pillar, supports, or sidewalls, which can be of any shape, configuration, location or orientation. For example, FIGS. 1A and 1B shows the second structures 120 to be rectangular support structures connecting a top surface of the substrate 102 to one or more portions of a bottom surface of the first structure 118; whereas, FIG. 2A shows the second structures 120 to be columns or pillars 202 connecting a top surface of the substrate 102 to one or more portions of a bottom surface of the first structure 118, and FIGS. 2B and 8-9 show the second structures 120 to be side support structures 204 or sidewalls connecting one or more portions of opposing sides of the first structure 118 to the substrate 102 such that the first structure 118 is suspended above the substrate.

In some embodiments, the mass-spring-damper system 106 includes one or more tuning masses 124 disposed on a top of the first structure 118 or integrated into the top of the first structure 118. The one or more tuning masses 124 can be of any shape, configuration, location or orientation. As shown in FIGS. 3A and 3B, the tuning mass 124 can be integrated into the first structure 118 by using materials having different densities. FIG. 3A illustrates the first structure 118 having a least a lower portion 302 having a first mass and an upper portion 304 having a second mass, wherein the second mass of the upper portion 304 is greater that the first mass of the lower portion 302. FIG. 3B illustrates the first structure 118 having many layers of increasing density from bottom 306 to top 308, or a desired density gradient. FIG. 3C illustrates the first structure 118 having a cavity or depression 310 in which material can be deposited to create the tuning mass 124, or different sizes of tuning masses 124 can be attached to the first structure 118. FIG. 3D illustrates the first structure 118 having the tuning mass 124 integrated into the first structure 118 or attached to the cavity or depression 310, and some additional cavities 312 in which material can be added. The first structure 118 may also include removable protrusions.

Now referring back to FIG. 1A, in some embodiments, the optical motion sensor 100 will be manufactured and provided with the following elements: (a) a laser light source 126 (e.g., diode laser, etc.) coupled to a first end 128 of the waveguide or optical fiber 108; (b) a detector 130 (e.g., frequency scanning photodetector, etc.) coupled to a second end 132 of the waveguide or optical fiber 108; and (c) a controller or processor 134 communicably coupled to the laser light source 126 and the detector 130. The controller or processor 134 can be pre-programmed and/or have an input/output interface. In other embodiments, the laser light source 126, the detector 130, the controller or processor 134, or any combination thereof will be integrated into a single device on the substrate 102. Moreover, the processor or controller 134 can be integrated into the detector 130. A separate or integrated power source (not shown) may also be included. In some embodiments and provided only as a non-limiting example, the optical motion sensor 100 can fit within an area less than 1 mm$^3$. The actual size will vary based on the intended use of the optical motion sensor 100, the manufacturing process used, and/or the sensitivity requirements, etc.

In operation, the laser light source 126 transmits a laser light 136a into the first end 128 of the waveguide or optical fiber 108. The whispering-gallery-mode-based optical resonator 104 is tuned to substantially match a frequency of the laser light 136a. Evanescent light 138 is coupled from the waveguide or optical fiber 108 into the whispering-gallery-mode-based optical resonator 104. The detector 130 receives laser light 136b from the second end 132 of the waveguide or optical fiber 108. Movement of the optical sensor 100 causes a small movement of the mass-spring-damper system 106 relative to the whispering-gallery-mode-based optical resonator 104 allowing it to penetrate the evanescent field (tail) of the evanescent light 138 extending from the surface of the whispering-gallery-mode-based optical resonator 104 thereby causing a shift of the whispering gallery mode of the whispering-gallery-mode-based optical resonator 104. The shift of the whispering gallery mode creates nulls or dips in the light transmitted through the waveguide or optical fiber 108 resulting in laser light 136b. The motion of the mass-spring-damper system 106 or change in the gap 114 can be measured by detecting a frequency of nulls/dips in the laser light 136b received from the waveguide or optical fiber 108. As previously indicated, the optical motion sensor 100 can operate as a seismometer, an accelerometer or a vibrometer.

In order to increase the sensitivity of the optical motion sensor 100, the end 112 of the mass-spring-damper system 106 is preferably a concave-shaped end such that the gap 114 is substantially uniform between the concave-shaped end 112 of the mass-spring-damper system 106 and the first side 110 of the whispering-gallery-mode-based optical resonator 104. The sensitivity can also be adjusted by changing the response characteristics of the mass-spring-damper system 106 (e.g., flexibility of the mass-spring-damper system with respect to the substrate 102, the width of the gap 114, the mass distribution profile of the mass-spring-damper system 106, etc.). For example, the sensor 100 can be calibrated by removing/etching a portion of a top (e.g., the tuning mass 124) of the mass-spring-damper system 106 or adding/depositing material on top (e.g., the tuning mass 124) of the mass-spring-damper system 106, increasing a size of the gap 114, and/or adding the second structures 120 (i.e., supports, etc.) to reduce the flexibility of the mass-spring-damper system 106 with respect to the substrate 102.

FIG. 4 depicts a schematic block diagram of a multidirectional optical motion sensor (two directions) 400 in accordance with another embodiment of the present invention. The multidirectional optical motion sensor 400 includes a first optical motion sensor 402a oriented to detect a first motion along a first direction 404, and a second optical motion sensor 402b oriented to detect a second motion along a second direction 406. The second direction 406 is different than the first direction 408. In some embodiments, the second direction 406 is orthogonal to the first direction 402. In other embodiments, the second direction 406 is not orthogonal to the first direction 402. Each optical motion sensor 402a and 402b includes, as previously described in reference to FIG. 1: a substrate, a whispering-gallery-mode-based optical resonator disposed on the substrate, wherein the whispering-gallery-mode-based optical resonator has a substantially circular cross section, a mass-spring-damper system disposed on the substrate proximate to a first side of the whispering-gallery-mode-based optical resonator, wherein an end of the mass-spring-damper system is separated from the whispering-gallery-mode-based optical resonator by a gap, and a waveguide or optical fiber abutting a second side of the whispering-gallery-mode-based optical resonator that is substantially opposite to the first side. The multidirectional optical motion sensor 400 also includes a laser light source 126 coupled to a first end 128*a* and 128*b* of each waveguide or optical fiber 108*a* and 108*b*, and a detector 130 coupled to a second end 132*a* and 132*b* of each waveguide or optical fiber 108*a* and 108*b*. In some embodiments, a controller or processor 134 is communicably coupled to the laser light source 126 and the detector 130. Note that the placement and orientation of the elements shown in FIG. 4 are for illustrative purposes only and the present invention is not limited to this placement and orientation of elements.

FIG. 5 is a block diagram of a multidirectional optical motion sensor (three directions) 500 in accordance with another embodiment of the present invention. The multidirectional optical motion sensor 500 includes a first optical motion sensor 502*a* oriented to detect a first motion along a first direction (x), and a second optical motion sensor 502*b* oriented to detect a second motion along a second direction (y), and a third optical motion sensor 502*c* oriented to detect a third motion along a third direction (z). The second direction (y) is different than the first direction (x), and the third direction (z) is different that both the first direction (x) and the second direction (y). In some embodiments, the first direction (x), second direction (y), and the third direction (z) are orthogonal to one another. In other embodiments, first direction (x), second direction (y), and the third direction (z) are not orthogonal to one another. Each optical motion sensor 502*a*, 502*b* and 502*c* includes the elements as previously described in reference to FIG. 1.

Figure 6:
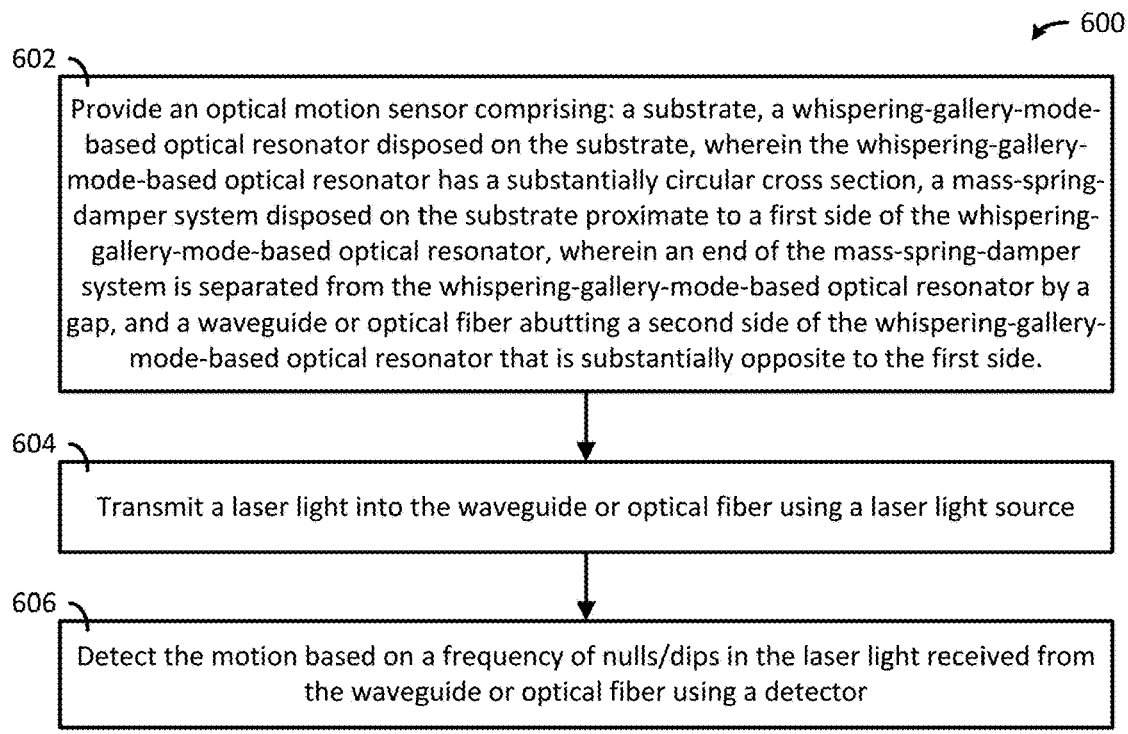
FIG. 6 is a flow chart of a method for detecting a motion in accordance with another embodiment of the present invention.

FIG. 6 is a flow chart of a method 600 for detecting a motion in accordance with another embodiment of the present invention. An optical motion sensor is provided in block 602. The optical motion sensor includes: a substrate; a whispering-gallery-mode-based optical resonator disposed on the substrate, wherein the whispering-gallery-mode-based optical resonator has a substantially circular cross section; a mass-spring-damper system disposed on the substrate proximate to a first side of the whispering-gallery-mode-based optical resonator, wherein an end of the mass-spring-damper system is separated from the whispering-gallery-mode-based optical resonator by a gap; and a waveguide or optical fiber abutting a second side of the whispering-gallery-mode-based optical resonator that is substantially opposite to the first side. A laser light is transmitted into the waveguide or optical fiber using a laser light source in block 604, and the motion is detected based on a frequency of nulls/dips in the laser light received from the waveguide or optical fiber using a detector in block 606.

In one aspect, the end of the mass-spring-damper system comprises a concave-shaped end such that the gap is substantially uniform between the concave-shaped end of the mass-spring-damper system and the first side of the whispering-gallery-mode-based optical resonator. In another aspect, the mass-spring-damper system comprises: a first structure; and one or more second structures flexibly connecting the first structure to the substrate such that a movement of the first structure is substantially limited to a direction substantially perpendicular to the waveguide or optical fiber. In another aspect, the mass-spring-damper system further comprises a proof mass disposed on a top of the first structure or integrated into the top of the first structure. In another aspect, the first structure comprises a least a lower portion having a first mass and an upper portion having a second mass, wherein the second mass of the upper portion is greater that the first mass of the lower portion. In another aspect, the one or more second structures comprise one or more bottom support structures connecting a top surface of the substrate to one or more portions of a bottom surface of the first structure. In another aspect, the one or more second structures comprise one or more side support structures connecting one or more portions of opposing sides of the first structure to the substrate. In another aspect, the laser light source comprises a diode laser; and the detector comprises a frequency scanning photodetector. In another aspect, the method further comprises creating the nulls/dips in the laser light whenever a change in the gap is caused by the motion. In another aspect, the motion comprises a seismic motion, an acceleration or a vibration.

Figure 7:
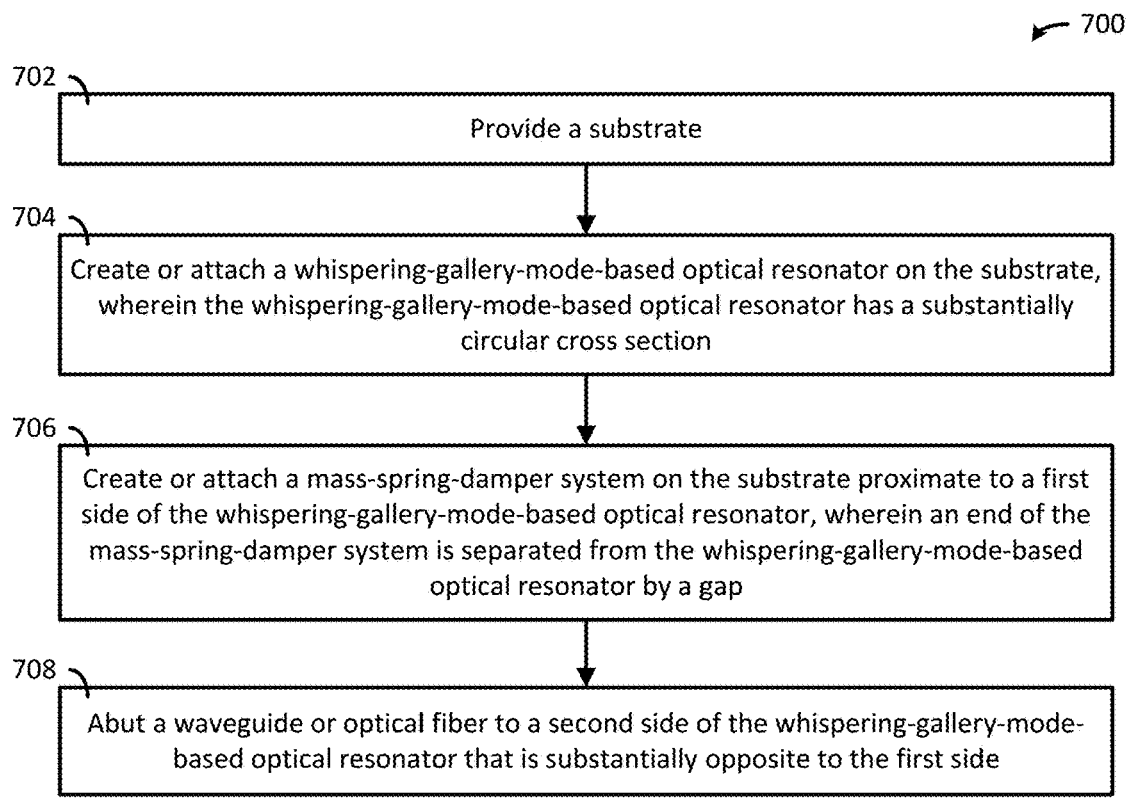
FIG. 7 is a flow chart of a method for fabricating an optical motion sensor in accordance with another embodiment of the present invention.

FIG. 7 is a flow chart of a method 700 for fabricating an optical motion sensor in accordance with another embodiment of the present invention. A substrate is provided in block 702. A whispering-gallery-mode-based optical resonator is created on or attached to the substrate in block 704. The whispering-gallery-mode-based optical resonator has a substantially circular cross section. A mass-spring-damper system is created on or attached to the substrate proximate to a first side of the whispering-gallery-mode-based optical resonator in block 706. An end of the mass-spring-damper system is separated from the whispering-gallery-mode-based optical resonator by a gap. A waveguide or optical fiber is abutted to a second side of the whispering-gallery-mode-based optical resonator that is substantially opposite to the first side in block 708.

In one aspect, the end of the mass-spring-damper system comprises a concave-shaped end such that the gap is substantially uniform between the concave-shaped end of the mass-spring-damper system and the first side of the whispering-gallery-mode-based optical resonator. In another aspect, creating or attaching the mass-spring-damper system on the substrate comprises: providing a first structure; and flexibly connecting the first structure to the substrate using one or more second structures such that a movement of the first structure is substantially limited to a direction substantially perpendicular to the waveguide or optical fiber. In another aspect, the method further comprises depositing or attaching a proof mass on a top of the first structure or into the top of the first structure. In another aspect, the first structure comprises a least a lower portion having a first mass and an upper portion having a second mass, wherein the second mass of the upper portion is greater that the first mass of the lower portion. In another aspect, the one or more second structures comprise one or more bottom support structures connecting a top surface of the substrate to one or more portions of a bottom surface of the first structure. In another aspect, the one or more second structures comprise one or more side support structures connecting one or more portions of opposing sides of the first structure to the substrate. In another aspect, the method further comprises: coupling a laser light source a first end of the waveguide or optical fiber; and coupling a detector to a second end of the waveguide or optical fiber. In another aspect, the laser light source comprises a diode laser; and the detector comprises a frequency scanning photodetector. In another aspect, the optical motion sensor comprises a seismometer, an accelerometer or a vibrometer.

In one embodiment, a whispering gallery mode optical (dielectric) micro-resonator and a dielectric micro-beam placed in close proximity to each other. The resonator and the beam are placed on a substrate. Several micro-resonator and micro-beam geometries and materials can be used to optimize the instrument's sensitivity, range and bandwidth. The principle of operation is based on the shifts of whispering galley optical modes (or morphology dependent resonances) of the dielectric micro-resonator. The acceleration (due to seismic activity, vibrations or other movement) causes a small movement of the dielectric micro-beam relative to the resonator allowing it to penetrate the evanescent field (tail) extending from the surface of the resonator thereby causing a shift of the whispering gallery mode of the resonator. A tuning mass can be placed on the beam or integrated into the beam to optimize the sensor sensitivity and bandwidth. A waveguide or an optical fiber abuts the micro-resonator on the side opposite to the beam so as to provide for coupling evanescent light from a frequency-scanned diode laser into the micro-resonator to excite the whispering gallery modes of the resonator, therein which are detected by a photodetector from nulls or dips in the light transmitted through the optical fiber. The frequency of the nulls/dips in the transmitted light provides a measure of the change in the relative spacing between the dielectric micro-beam and the optical resonator caused by the acceleration. A schematic of the instrument is shown in FIG. 1. The microbeam is connected to the substrate through legs that extend along the full (or most) of the span of the beam such that the beam motion is limited to the direction indicated. This way, acceleration only in that direction is measured. The system can be extended to a 3-axis seismometer by using three instruments such as that shown in FIG. 1 aligned in three orthogonal directions. The tuning mass can be adjusted to optimize the sensitivity and bandwidth of the instrument.

The micro-seismometer can be fabricated using contemporary micro-fabrication techniques as a monolithic, rugged device for a wide range of applications. Alternatively, it can be fabricated as individual components and then assembled together into a single device. The dielectric material can be Si (as shown) or other similar materials.

A non-limiting example of micro-seismometers for use on a spacecraft will now be described. The micro-seismometers are unpowered, extremely small ($\leq 1$ cm$^3$) and low mass ($\leq 10$ gr with 5 nano-g resolution at 100 Hz bandwidth. Multiple sensors at corners or even external to the spacecraft can be read by the same (<200 g) laser readout system to provide an ability for the spacecraft to search for coherent signals not associated with spacecraft operations and less susceptible to asymmetries in wave transfer through the spacecraft body.

The sensors can be multiplexed and processed into a coherent signal to eliminate spacecraft activity and thermal noise local to a given sensor and preserve the ground motion signal seen by all sensors. Additionally, there is an opportunity to place redundant low mass sensors on the spacecraft footpads, avoiding much of the expected signal attenuation. These outboard sensors require only an optical fiber coupled to the attending electronics by a light bridge to maintain thermal insulation.

FIG. 8 is a schematic of a micro-seismometer core 800 in accordance with another embodiment of the present invention. The core 800 is a monolithic micro-fabricated device. The disk resonator 802, ~1 mm in diameter, contains optical modes excited by side-coupled light from a waveguide 804. The proof mass 806 is connected to the sidewalls 808 through flexures or arms 810 such that the beam motion is limited to the desired direction. The proof mass 806 is suspended by the flexures or arms 810 and is not connected to the base 812 of the core 800. Note that the flexures or arms 810 can be of any design or configuration to provide the desired spring action. For example, a first sidewall is connected to the substrate proximate to one side of the proof mass 806, a second sidewall is connected to the substrate proximate to an opposite side of the proof mass 806, and one or more flexures or arms connect each of the first sidewall and second sidewall such that the proof mass 806 is suspended above the substrate. The beam and the arms serve as the spring and proof mass, and the resonator 802 is the transducer. The resonator and proof mass geometry, and materials are optimized to obtain the desired instrument performance and to withstand the demanding conditions expected by the spacecraft.

The principle of operation is based on the shifts of whispering galley optical modes (or morphology dependent resonances) of the dielectric resonator. The acceleration due to seismic activity causes a small movement of the beam relative to the resonator allowing it to penetrate the evanescent field (tail) that extends from the side surface of the resonator, causing a shift of the whispering gallery modes (WGM) of the resonator. The WGM shifts are proportional to the displacement of the micro-beam proof mass. The optical waveguide serves as an input/output bus, it is connected to a tunable diode laser on one end and terminated at a photodetector on the other. The diode is frequency modulated to excite the WGM of the resonator. The WGM are registered as sharp dips in the transmission spectrum through the waveguide. The shift of the WGM provides a measure of the change in the relative spacing between the micro-beam and the resonator caused by the acceleration. The extremely high WGM Q-factors afford high sensitivity to minute displacements of the micro-beam (in the order of a nanometer). A 3-axis seismometer uses three sets of micro-fabricated beams and resonators aligned in three directions.

The micro-fabricated seismometer affords advantages over conventional instrumentation in terms of size, weight and power consumption. Unlike geophones and other typical conventional seismometers (capacitive or inductive), the sensing element is passive with no electrical current running through the sensor. It is connected to a diode laser and detector housed in the electro-optic control unit through optical fiber. Hence, the control unit can be located at a considerable distance from the sensing element in a controlled environment. A single laser diode can serve multiples of sensors. Therefore, multiple sensing elements can be placed inside the vault or other locations on the lander.

Planetary exploration presents considerable challenges to instruments, such as extreme temperatures and radiation. This all-monolithic optical micro-seismometer presents attributes compatible for planetary exploration:

Optical whispering gallery modes in disk resonators exceed $Q \geq 10^6$, thus providing a high-sensitivity acceleration measurement, The seismometer is fabricated from materials that exhibit low mechanical dissipation at low temperatures, high tolerance to radiation and insensitive to magnetic fields, The seismometer uses optical fibers to communicate between the sensor core and the attending electronics and laser diode. Therefore, it offers the additional option to place distributed sensors outside of the lander's vault, The signal processing consists of analyzing the transmission signal of the resonator and requires small computing resources, The size of the sensor is estimated to be less than one cubic centimeter, and that of the electronics less than 200 cubic centimeters, The total instrument weight is estimated to be less than 0.2 kg, The total energy requirements for the instrument for the mission duration is estimated to be 80 W-hrs, The micro fabricated sensor (together with the built-in stops to prevent excessive flexing of proof-mass beam) make the instrument suitable for the rigor of launch and flight.

Multiple sensors on the spacecraft will enable seismic interferometric techniques—the study of the differences between incoming seismic signals. Characterization of the spacecraft noise environment is important in order to detect long-period seismic waves. With multiple sensors on the spacecraft deck, seismic interferometry can be used to remove non-coherent signals from two closely situated instruments. This will allow for differentiating signals originating close to and on the spacecraft versus more distant teleseisms, a distinct advantage over single station recordings with no independent constraints on signal origins. Multiple sensors on the spacecraft will enable the use of the spacecraft as a seismic antenna, providing directivity for high frequency nearby events. Multiple sensors will require the on-board storage and processing of signals collected by the seismometers, and reduction of the data into smaller number of bits that can then be returned to Earth. As the instruments are unpowered, the energy savings can be allotted to more processing power on the spacecraft. For most single station approaches, the data would consist of a continuous, low sample rate (≤20 Hz) three component data, usually resampled from a higher sample rate recording digitizer. These data products would include such a data stream, only corrected for short period, incoherent seismic energy via interferometry. The sensors can also return high frequency seismic events detected on multiple sensors via cross-correlation. These locally sourced, high frequency events would be clipped out of the continuous time series and returned alongside the long period data. For example, nearby thermally induced disturbances in a planet surface could be returned as 250 millisecond long traces on four vertical channels, and digitized at 5 kHz. This is comparable to recordings of active sources and audible elastic waves on Earth. Such events with a 50% compression ratio would require only 6 Mbits or ~1.0% of the total data allotted to the science transmissions of the mission and add valuable science about the nature of the lander environment and subsurface not provided by longer period single station approaches.

The micro-optical seismometer exploits the whispering gallery mode (WGM) optical phenomenon (also known as morphology dependent resonances, MDR) associated with circular dielectric micro-cavities (resonators). The modes are excited by tangentially coupling frequency modulated light from a diode laser, typically using an optical fiber or waveguide. The WGM are observed as narrow dips in the transmission spectrum on the opposite end of the waveguide as the diode laser is frequency tuned across a narrow range. The linewidth, $\delta\lambda$, of the dips are extremely narrow due to the large quality factors, $Q=\lambda/\delta\lambda$ ($\lambda$ is vacuum wavelength of laser) of the WGM. With silica spheres, Q values up to $10^8$ have been obtained. Therefore, any minute change in the resonator morphology caused by a perturbation of an external physical condition can be determined precisely by observing WGM shifts in the transmission spectrum.

A prototype fabricated in a clean room facility is shown in FIG. 9. The monolithically fabricated seismometer core includes the resonator, waveguide and beam or proof mass. The waveguide carries light from the diode laser and serves as an input/output port for the disk resonator. The laser is a DFB diode of a few milliWatts and is sufficient to power multiples of individual seismometer cores with access provided by optical fiber splitters. Fast laser tuning and signal processing methodologies are capable of measuring WGM shifts at a rate in excess of 1 kHz[15].

A schematic of the instrument is shown in FIG. 10. The attending and processing opto/electronic unit 1002 houses the laser source, beam splitter (B/S), the photodetectors (PD), the electronic controller digitizer (A/D) and the signal processor. The attending and processing opto/electronic unit 1002 is linked to the sensors 1004 via optical fibers 1006. The seismometer electronics can be designed to operate in open-loop mode. In the open-loop mode the laser is scanned across a determined spectral band and the amount of resonance shifts is proportional to the base acceleration. This mode is lower power and a FPGA is sufficient for signal processing to determine resonance shifts. The acceleration is determined from the WGM shifts through transmission spectrum for each sensor (resonator). The attending laser's frequency is harmonically modulated to excite the WGM of the resonators. At each scan of the laser, the WGM shifts are determined using a cross-correlation method. The method is straightforward and easily implemented on an FPGA.

Methods of seismometer testing, calibration, and characterization are well described. For example, three sensors can be used to simultaneously estimate the self-noise of an instrument and the relative transfer function is of particular use for deriving estimates when instrument self-noise may be 70 dB below ambient noise levels. The instrument can be less than 200 cm$^3$ in total volume and have a mass less than 0.2 kg. The volume of a 3-axis sensor is less than 1 cm$^3$ weighing 6 gr or less. The instrument is designed to be kept in the spacecraft's vault (both the electro-optic unit and the sensor). However, the sensing principle and design provides the option to place additional sensors outside of the vault, on or near the lander. Further multiples of sensors addressing specific frequency bands and dynamic ranges can be part of a single instrument attended by the same electro-optic control unit.

The principle of operation is such that the base acceleration, a, is proportional to the distance, $x_r$, between the beam and the resonator; $x_r=(A/\omega^2)a$. Here, $\omega$ is the natural frequency of the beam and the connecting arms. The sensor's operation range is designed such that A=1.

The acceleration resolution is estimated from.

$$\delta a = \frac{\lambda}{Q}\frac{\omega^2}{A}\left(\frac{d\lambda}{dx_r}\right)^{-1}$$

where Q is the resonator's optical quality factor and $\lambda$ is the laser wavelength. The acceleration resolution is a function of the bandwidth. FIG. 11 shows a numerical calculation of WGM shift as a function of the distance between the resonator and the beam. The shaded area indicates the beam's range of relative motion. For $Q=10^6$, $\lambda=630$ nm, and $\omega=120$ Hz (sensor bandwidth ~100 Hz), the estimated acceleration resolution is $\delta a \approx 0.6$ nano-g. The resolution significantly increases for lower bandwidths. The proposed instrument's noise floor is determined by the Boltzmann thermal noise. For a 100 Hz bandwidth sensor, the estimated noise floor at room temperature is ~5 nano-g/Hz$^{1/2}$.

The dynamic range of each sensor, determined by the free spectral range of the resonator and the range of motion of the beam, is ~30 dB. Within a single instrument, several sensors can be designed and deployed to target different frequency bands of interest optimizing resolution and the overall dynamic range. The change of design is simply a photomask change for the sensor fabrication. The actual fabrication process remains the same.

The fabrication of the sensor can be based on single crystal silicon microelectromechanical (MEMS) process technology using silicon-on-insulator (SOT) substrates. The thickness of the WGM sensor will be determined by the thickness of the silicon substrate layer, with standard commercially available substrates ranging from 0.5 to 1.2 mm. The buried insulator layer will be used as the etch stop for the deep reactive ion etch used to pattern the WGM sensor.

The fabrication of the sensor will start with the deposition of a thin film of aluminum (200 nm) using e-beam evaporation. The thin film of aluminum will act as a hard mask during the deep reactive ion etch. The aluminum will be patterned using standard photolithographic processes and aluminum etchant. Once the aluminum is patterned, the next step is to use the Bosch process to anisotropically reactive ion etch the single crystal silicon. A Plasma-Therm DSE etcher can be used. The standard process conditions provide an etch rate of approximately 400 nm/cycle, with each cycle (etch-purge-deposit) taking 10 seconds. Aspect ratios of >100:1 have been demonstrated using a similar process.

Once the deep reactive ion etch is complete, the next step is to release the WGM proof mass from the handle layer to make it free standing. The WGM sensor is released by isotropically etching the insulator layer under the sensor using a wet etch process after etching an opening from the backside. Once the device fabrication is complete, additional mass can be attached to the block to adjust the performance characteristics of the device. A mass as small as 0.00116 mg can be attached using a nano-manipulator and ion beam welding in a focused ion beam system.

Several methods are available to deposit thin films to change device characteristics. For instance, to change the index of refraction of the surface of the resonator and/or block, a thin film of $Al_2O_3$ (n=1.75) can be deposited using atomic layer deposition, or a thin film of thermal $SiO_2$ (n=1.45) can be grown. The thickness of these films can be controlled to within a few nanometers. Films can also be deposited to change the distance between the block and the resonator. It is possible to deposit very conformal films of $SiO_2$ or $Si_3N_4$ several microns thick using low pressure chemical vapor deposition.

There are several process parameters, including temperature, pressure and power that impact etch rate and surface roughness. The etching conditions are optimized to minimize surface roughness. Additionally, the etched surface can be smoothed using thermal oxidation and wet etching. The goal is to maximize coupling between the wave guide/fiber optic and the resonator.

Since the micro-fabrication process can produce multiple sensor configurations on a single wafer, design variants can be used specifically to characterize sources and types of noise. For example, changing the spring stiffness and/or mass changes the sensitivity but leaves many of the non-mechanical self-noise components unchanged allowing for a simplified initial noise characterization when developing an instrument intended for a seismic background noise environment lower than the quietest Earth observatory. Blocked mass versions or massless systems can provide the equivalent of a shorted input noise test in conventional digitizers and components designed for vertical measurement with earth gravity bias may be produced. In addition, the size and simplicity of the sensor provides the ability to closely couple pairs, triads, or quartets of instruments in a single package eliminating the problems of sensor coupling when doing traditional high frequency coherence tests on a seismic pier.

It is contemplated that any embodiment discussed in this specification can be implemented with respect to any method, kit, apparatus, device or system of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), property(ies), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

What is claimed is:

1. An optical motion sensor comprising:
    a substrate;
    a whispering-gallery-mode-based optical resonator disposed on the substrate, wherein the whispering-gallery-mode-based optical resonator has a substantially circular cross-section;
    a mass-spring-damper system disposed on the substrate proximate to a first side of the whispering-gallery-mode-based optical resonator, wherein an end of the mass-spring-damper system comprises a concave-shaped end that is separated from the whispering-gallery-mode-based optical resonator by a gap, and the gap is substantially uniform between the concave-shaped end of the mass-spring-damper system and the first side of the whisper-gallery-mode-based optical resonator; and
    a waveguide or optical fiber abutting a second side of the whispering-gallery-mode-based optical resonator that is substantially opposite to the first side.

2. The optical motion sensor of claim 1, wherein the mass-spring-damper system comprises:
    a first structure; and
    one or more second structures flexibly connecting the first structure to the substrate such that a movement of the first structure is substantially limited to a direction substantially perpendicular to the waveguide or optical fiber.

3. The optical motion sensor of claim 2, further comprising a tuning mass disposed on a top of the first structure or integrated into the top of the first structure.

4. The optical motion sensor of claim 2, wherein the first structure comprises at least a lower portion having a first mass and an upper portion having a second mass, wherein the second mass of the upper portion is greater that the first mass of the lower portion.

5. The optical motion sensor of claim 2, wherein the one or more second structures comprise one or more bottom support structures connecting a top surface of the substrate to one or more portions of a bottom surface of the first structure.

6. The optical motion sensor of claim 2, wherein the one or more second structures comprise one or more side support structures connecting one or more portions of opposing sides of the first structure to the substrate such that the first structure is suspended above the substrate.

7. The optical motion sensor of claim 6, wherein the one or more side support structures comprise:
    a first sidewall connected to the substrate proximate to one side of the first structure;
    a second sidewall connected to the substrate proximate to an opposite side of the first structure; and
    one or more flexures or arms connecting each of the first sidewall and second sidewall.

8. The optical motion sensor of claim 1, further comprising:
    a laser light source coupled to a first end of the waveguide or optical fiber; and
    a detector coupled to a second end of the waveguide or optical fiber.

9. The optical motion sensor of claim 8, wherein:
    the laser light source comprises a diode laser; and
    the detector comprises a frequency scanning photodetector.

10. The optical motion sensor of claim 8, wherein the detector determines a measure of a change in the gap caused by a motion using a frequency of nulls/dips in a transmitted light received from the waveguide or optical fiber.

11. The optical motion sensor of claim 1, wherein the optical motion sensor comprises a seismometer, an accelerometer or a vibrometer.

12. A method for detecting a motion comprising:
    providing an optical motion sensor comprising:
        a substrate,
        a whispering-gallery-mode-based optical resonator disposed on the substrate, wherein the whispering-gallery-mode-based optical resonator has a substantially circular cross-section,
        a mass-spring-damper system disposed on the substrate proximate to a first side of the whispering-gallery-mode-based optical resonator, wherein an end of the mass-spring-damper system comprises a concave-shaped end that is separated from the whispering-gallery-mode-based optical resonator by a gap, and the gap is substantially uniform between the concave-shaped end of the mass-spring-damper system and the first side of the whisper-gallery-mode-based optical resonator, and a waveguide or optical fiber abutting a second side of the whispering-gallery-mode-based optical resonator that is substantially opposite to the first side;

transmitting a laser light into the waveguide or optical fiber using a laser light source; and detecting the motion based on a frequency of nulls/dips in the laser light received from the waveguide or optical fiber using a detector.

13. The method of claim 12, wherein the mass-spring-damper system comprises:
a first structure; and
one or more second structures flexibly connecting the first structure to the substrate such that a movement of the first structure is substantially limited to a direction substantially perpendicular to the waveguide or optical fiber.

14. The method of claim 12, further comprising creating the nulls/dips in the laser light whenever a change in the gap is caused by the motion.

15. The method of claim 12, wherein the motion comprises a seismic motion, an acceleration or a vibration.

16. A method for fabricating an optical motion sensor comprising:
providing a substrate;
creating or attaching a whispering-gallery-mode-based optical resonator on the substrate, wherein the whispering-gallery-mode-based optical resonator has a substantially circular cross-section;
creating or attaching a mass-spring-damper system on the substrate proximate to a first side of the whispering-gallery-mode-based optical resonator, wherein an end of the mass-spring-damper system comprises a concave-shaped end that is separated from the whispering-gallery-mode-based optical resonator by a gap, and the gap is substantially uniform between the concave-shaped end of the mass-spring-damper system and the first side of the whisper-gallery-mode-based optical resonator; and
abutting a waveguide or optical fiber to a second side of the whispering-gallery-mode-based optical resonator that is substantially opposite to the first side.

17. The method of claim 16, wherein creating or attaching the mass-spring-damper system on the substrate comprises:
providing a first structure; and
flexibly connecting the first structure to the substrate using one or more second structures such that a movement of the first structure is substantially limited to a direction substantially perpendicular to the waveguide or optical fiber.

18. The method of claim 17, further comprising depositing or attaching a tuning mass on a top of the first structure or into the top of the first structure.

19. The method of claim 16, further comprising:
coupling a laser light source a first end of the waveguide or optical fiber; and
coupling a detector to a second end of the waveguide or optical fiber.

20. A multidirectional optical motion sensor comprising:
a first optical motion sensor oriented to detect a first motion along a first direction;
a second optical motion sensor oriented to detect a second motion along a second direction, wherein the second direction is different than the first direction; and
each optical motion sensor comprising:
a substrate,
a whispering-gallery-mode-based optical resonator disposed on the substrate, wherein the whispering-gallery-mode-based optical resonator has a substantially circular cross-section,
a mass-spring-damper system disposed on the substrate proximate to a first side of the whispering-gallery-mode-based optical resonator, wherein an end of the mass-spring-damper system comprises a concave-shaped end that is separated from the whispering-gallery-mode-based optical resonator by a gap, and the gap is substantially uniform between the concave-shaped end of the mass-spring-damper system and the first side of the whisper-gallery-mode-based optical resonator, and
a waveguide or optical fiber abutting a second side of the whispering-gallery-mode-based optical resonator that is substantially opposite to the first side.

21. The multidirectional optical motion sensor of claim 20, wherein the second direction is orthogonal to the first direction.

22. The multidirectional optical motion sensor of claim 20, further comprising a third optical motion sensor oriented to detect a third motion along a third direction, wherein the third direction is different than the first direction and the second direction.

23. The multidirectional optical motion sensor of claim 20, wherein the mass-spring-damper system comprises:
a first structure; and
one or more second structures flexibly connecting the first structure to the substrate such that a movement of the first structure is substantially limited to a direction substantially perpendicular to the waveguide or optical fiber.

24. The multidirectional optical motion sensor of claim 20, further comprising:
a laser light source coupled to a first end of each waveguide or optical fiber; and
a detector coupled to a second end of each waveguide or optical fiber.

25. The multidirectional optical motion sensor of claim 24, wherein the detector determines a measure of a change in the gap caused by a motion using a frequency of nulls/dips in a transmitted light received from each waveguide or optical fiber.

* * * * *